United States Patent
Bruestle et al.

(10) Patent No.: US 11,704,548 B2
(45) Date of Patent: Jul. 18, 2023

(54) MULTICAST NETWORK AND MEMORY TRANSFER OPTIMIZATIONS FOR NEURAL NETWORK HARDWARE ACCELERATION

(71) Applicant: Intel Corporation, Santa Clara, CA (US)

(72) Inventors: Jeremy Bruestle, Seattle, WA (US); Choong Ng, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/444,752

(22) Filed: Aug. 10, 2021

(65) Prior Publication Data

US 2021/0374512 A1    Dec. 2, 2021

Related U.S. Application Data

(62) Division of application No. 15/588,569, filed on May 5, 2017, now Pat. No. 11,120,329.

(60) Provisional application No. 62/333,214, filed on May 7, 2016.

(51) Int. Cl.
*G06N 3/063* (2023.01)
*G06F 12/06* (2006.01)
(Continued)

(52) U.S. Cl.
CPC ............ *G06N 3/063* (2013.01); *G06F 9/345* (2013.01); *G06F 12/06* (2013.01); *G06N 3/04* (2013.01); *H04L 49/1507* (2013.01); *H04L 15/00* (2013.01)

(58) Field of Classification Search
CPC .......... G06N 3/063; G06N 3/04; G06F 9/345; G06F 12/06; H04L 49/1507; H04L 15/00
See application file for complete search history.

(56) References Cited

U.S. PATENT DOCUMENTS

| 4,964,040 A | 10/1990 | Wilcox |
| 5,138,695 A | 8/1992 | Means et al. |

(Continued)

FOREIGN PATENT DOCUMENTS

| CN | 103778100 A | 5/2014 |
| CN | 104603739 A | 5/2015 |
| WO | 2006115896 | 11/2006 |

OTHER PUBLICATIONS

European Search Report from related application EP 17796609 dated Apr. 2, 2020.
(Continued)

*Primary Examiner* — Duc C Ho
(74) *Attorney, Agent, or Firm* — Trop, Pruner & Hu, P.C.

(57) ABSTRACT

In one embodiment, a system to deterministically transfer partitions of contiguous computer readable data in constant time includes a computer readable memory and a modulo address generator. The computer readable memory is organized into D banks, to contain contiguous data including a plurality of data elements of size M which are constituent data elements of a vector with N data elements, the data elements to start at an offset address O. The modulo address generator is to generate the addresses of the data elements of a vector with i data elements stored in the computer readable memory, the modulo address generator including at least one forward permutaton to permute data elements with addresses of the form O+M*i where 0<=i<N. Other embodiments are described and claimed.

17 Claims, 8 Drawing Sheets

(51) Int. Cl.
  *G06F 9/345* (2018.01)
  *H04L 49/15* (2022.01)
  *G06N 3/04* (2023.01)
  *H04L 15/00* (2006.01)

(56) References Cited

U.S. PATENT DOCUMENTS

| | | | |
|---|---|---|---|
| 5,625,825 | A | 4/1997 | Rostoker et al. |
| 5,751,987 | A | 5/1998 | Mahant-Shetti et al. |
| 5,892,697 | A | 4/1999 | Brakefield |
| 6,216,167 | B1 | 4/2001 | Momirov |
| 6,285,779 | B1 | 9/2001 | Lapidous et al. |
| 6,571,268 | B1 | 5/2003 | Giacalone et al. |
| 6,768,992 | B1 | 7/2004 | Jolitz |
| 7,287,148 | B2 * | 10/2007 | Kanapathippillai .. G06F 9/3877 712/35 |
| 8,051,227 | B1 | 11/2011 | Gewirtz et al. |
| 9,747,547 | B2 | 8/2017 | McCormick et al. |
| 2002/0062466 | A1 | 5/2002 | Noguchi |
| 2002/0075871 | A1 | 6/2002 | Blanc et al. |
| 2002/0126661 | A1 | 9/2002 | Ngai |
| 2004/0078418 | A1 | 4/2004 | Law et al. |
| 2006/0259744 | A1 | 11/2006 | Matthes |
| 2007/0005322 | A1 | 1/2007 | Patzer et al. |
| 2007/0211064 | A1 | 9/2007 | Buck et al. |
| 2009/0313195 | A1 | 12/2009 | McDaid et al. |
| 2010/0005221 | A1 | 1/2010 | Esko |
| 2010/0076915 | A1 | 3/2010 | Xu et al. |
| 2011/0029471 | A1 | 2/2011 | Chakradhar et al. |
| 2011/0206053 | A1 | 8/2011 | Henry et al. |
| 2012/0005141 | A1 | 1/2012 | Sasagawa |
| 2013/0054665 | A1 | 2/2013 | Felch |
| 2014/0040700 | A1 | 2/2014 | Kobori et al. |
| 2014/0136583 | A1 | 5/2014 | Hyde et al. |
| 2014/0188968 | A1 | 7/2014 | Kaul et al. |
| 2014/0344194 | A1 | 11/2014 | Lee et al. |
| 2015/0199963 | A1 | 7/2015 | Maaninen |
| 2015/0324685 | A1 | 11/2015 | Bohn et al. |
| 2016/0379137 | A1 | 12/2016 | Burger et al. |
| 2017/0323224 | A1 * | 11/2017 | Bruestle ................ G06N 20/00 |
| 2019/0205269 | A1 | 7/2019 | Fleming, Jr. |

OTHER PUBLICATIONS

European Search Report from related application EP 17796609 dated Dec. 13, 2019.
Jones et al., "Learning in Linear Systolic Neural Network Engines: Analysis and Implementation", IEEE Transactions on Neural Networks, Jul. 1, 1993.
European Search Report from related application EP 17796610 dated Dec. 13, 2019.
Minkenberg, "On packet switch design", Eindoven University of Technology, Jan. 1, 2001.
Final Office Action in related matter U.S. Appl. No. 15/399,714 dated Jan. 2, 2020.
International Search Report and Written Opinion from related application PCT/US2017/012600 dated Mar. 27, 2017.
International Preliminary Report on Patentability and Written Opinion received in PCT/US2017/012600, dated Jul. 10, 2018.
Office Action from related application U.S. Appl. No. 15/399,714 dated Jul. 25, 2019.
European Search Report from related application EP17736464 dated Jun. 21, 2019.
Farabet et al., "NeuFlow: A Runtime Reconfigurable Dataflow Processor for Vision", Computer Vision and Pattern Recognition Workshops (CVPRW), 2011 IEEE Computer Society Conference on IEEE, Jun. 20, 2011.
Chen et al., "DianNao: A Small-Footprint High-Throughput Accelerator for Ubiquitous Machine-Learning", downloaded from www.novel.ict.ac.cn/ychen/pdf/DianNao.pdf on Nov. 6, 2017.
Kanoun et al., "Low Power and Scalable Many-Core Architecture for Big-Data Stream Computing", 2014 IEEE Computer Society Annual Symposium on VLSI, IEEE, Jul. 9, 2014.
International Preliminary Report on Patentability and Written Opinion received in PCT/US2017/031477, dated Nov. 22, 2018, 8 pages.
International Preliminary Report on Patentability and Written Opinion received in PCT/US2017/031478, dated Nov. 22, 2018, 8 pages.
International Search Report and Written Opinion dated Oct. 2, 2017, for PCT Application No. PCT/US2017/031477, 10 pages.
International Search Report and Written Opinion dated Oct. 24, 2017, for PCT Application No. PCT/US2017/031478, 10 pages.
Lozito et al., "FPGA Implementations of Feed Forward Neural Network by Using Floating Point Hardware Accelerators," Theoretical and Applied Electrical Engineering vol. 12, No. 1, Mar. 2014 (http://advances.utc.sk/index.php/AEEE/article/view/831).
Chinese Patent Office, Office Action dated Nov. 24, 2022 in Chinese Patent Application No. 201780040900.0 (8 pages).
Chen et al., "An Efficient SIMD Parallel Memory Structure for Radix-2 FFT Computation", Acta Electronica Sinica, vol. 44, Issue No. 2, Feb. 2016, pp. 241-246.
Tong et al., "A General Method of Designing SIMD Computer Using Non-Linear Storage Schemes", Journal of Computer Research & Development, vol. 37, No. 2, Feb. 2000, pp. 194-200.

* cited by examiner

MULTICAST NETWORK AND MEMORY TRANSFER OPTIMIZATIONS FOR NEURAL NETWORK HARDWARE ACCELERATION

CROSS REFERENCE TO RELATED APPLICATION

This application is a divisional of U.S. application Ser. No. 15/588,569, filed May 5, 2017, now U.S. Pat. No. 10,955,899, issued Sep. 14, 2021, which claims priority to U.S. Provisional Application No. 62/333,214, filed May 7, 2016, which are hereby incorporated by reference.

BACKGROUND

Machine learning and deep neural networks, including deep belief networks (collectively called neural networks), are rapidly becoming ubiquitous. Applications initially began with object recognition in computer images and with speech recognition now common in voice user interfaces such as Apple Siri™, Microsoft Cortana™, Amazon Alexa™, Google Assistant™ and the like. Neural networks are presently being applied to industrial controllers, medical diagnoses, leading to a burgeoning of neural networks.

However, neural network operations, at least as applied to machine learning and deep neural networks, typically make use of dense linear algebra operations, such as matrix operations, as well as more neural network specific operations such as convolutions, max pooling, and data noise generation. Such operations lend themselves to parallel operations, such as calculating matrix rows in parallel, which if performed on commonly available central processing units (CPU) which generally are not parallel, leads to suboptimal performance.

Accordingly, arrays of graphical processing units (GPU), which are optimized for matrix operations and parallel operations have been applied to neural networks, such as via NVidia's CUDA™ architecture. However, while GPUs are optimized for matrix operations, they do not provide optimizations specific to neural networks, such as convolutions, max pooling and noise generation, thereby limiting their performance in neural network operations.

BRIEF DESCRIPTION OF THE DRAWINGS

The Detailed Description is set forth with reference to the accompanying figures.

DETAILED DESCRIPTION

Overview of Multicast Network and Memory Transfer Optimizations for Neural Network Hardware Acceleration Neural network hardware acceleration occurs within the context of an environment to develop, compile (or programmatically transform), and execute applications that make use of neural networks. Such applications are often called machine learning applications, deep neural network applications, and/or deep belief network applications. While machine learning does not strictly demand the use of a neural network, many common present day frameworks and techniques make use of neural networks. Deep neural networks may be roughly considered to be a series or network of neural networks.

As stated above, present day hardware, either in the form of a central processing unit (CPU) or a graphical processing unit (GPU) array do not provide hardware optimizations for many operations common to neural networks. Disclosed herein are various techniques for neural network hardware acceleration, specifically in for multicast networks for data dispatched to data receivers such as execution units, and for memory transfer.

The optimizations disclosed herein are designed to perform those operations in hardware in constant time (Big O(C)) or linear time (Big O(n)) that CPUs and/or GPUs would otherwise use Big O(n log(n)) or higher polynomial time. The optimizations may make use of information at design time and/or compile time, may make use of transformations to enable multidimensional operations common to matrix and tensor operations, and may recognize and exploit instruction pipeline opportunities in hardware.

Figure 1:
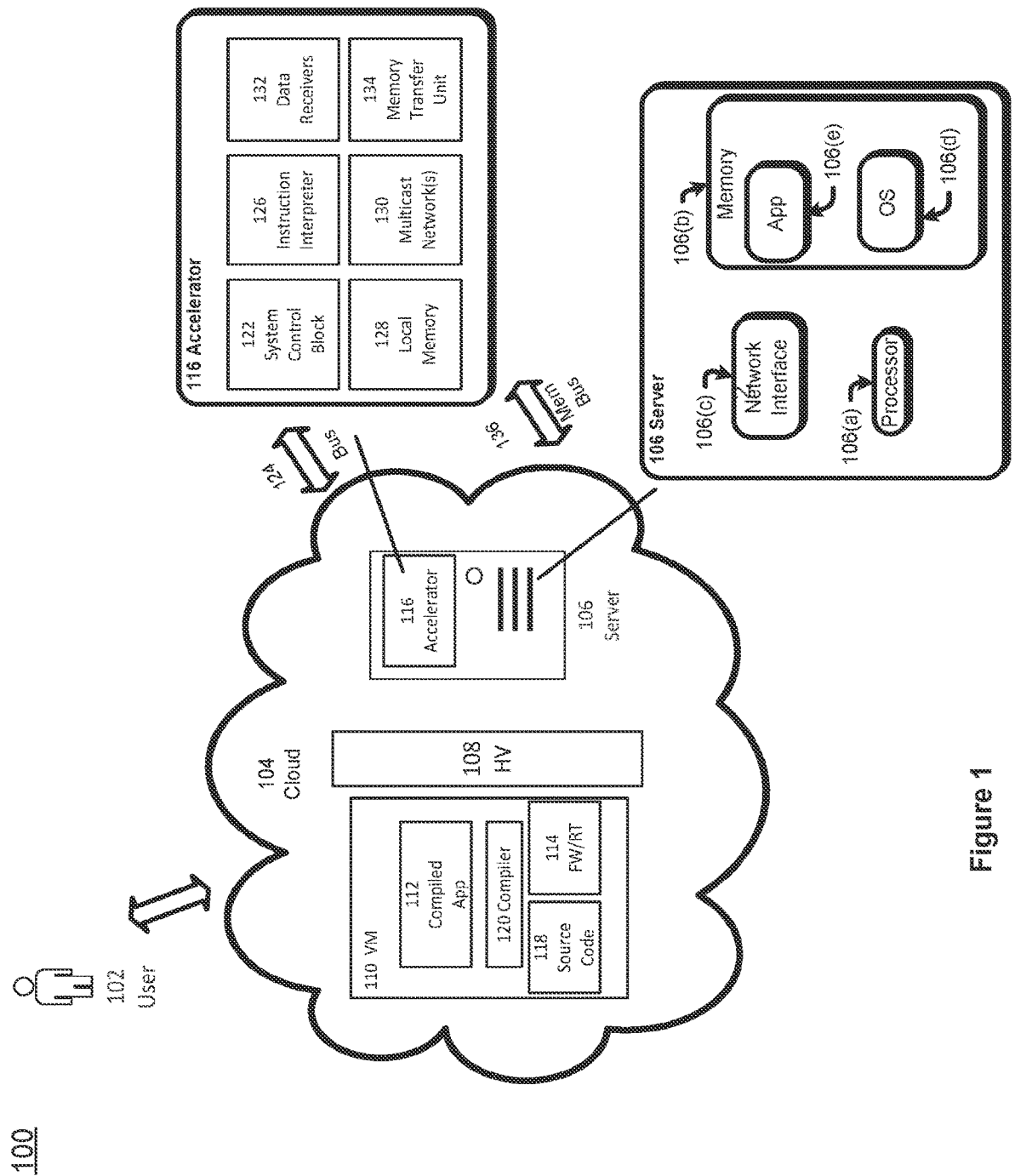
FIG. 1 is a context diagram of a system environment for machine learning hardware acceleration.

FIG. 1 provides a context diagram 100 in which neural network hardware acceleration may occur. Specifically, a user 102, accesses computing services from cloud 104. The user may be a developer or may be an end user.

Cloud 104 is comprised of several servers 106 capable of storing computer readable data and executing computer readable instructions. Those servers 106 may be disaggregated by a hyper visor 108 to serve virtual machines 110.

A compiled neural network application 112 may execute either directly on a server 106 or on a virtual machine 110. The server 106 and/or the virtual machine 110 may be provisioned by one or more neural network frameworks and/or runtimes 114. A neural network hardware acceleration unit 116 may be connected to a server 106 or may be standalone. As a resource of a server 106, a neural network hardware acceleration unit may be disaggregated as well by hypervisor 108 thereby making its resources available to a virtual machine 110.

The compiled neural network application 112 is a result of source code 118 for the neural network application as compiled by compiler 120. The neural network application 112 may also have been linked to libraries specific to the neural network frameworks or runtimes 114.

Turning back to the neural network hardware accelerator unit 116, it comprises a system control block 122 that among other operations may transfer instruction. It interfaces with a controlling CPU via a communications bus 124. The hardware accelerator unit will have an instruction interpreter 126 that interfaces with local memory 128, one or more multicast networks 130 and a plurality of data receivers 132. In some embodiments, the data receivers 132 may be execution units. The interface with offsite data may be via a data transfer unit 134 interfacing over a memory bus 136.

Figure 2:
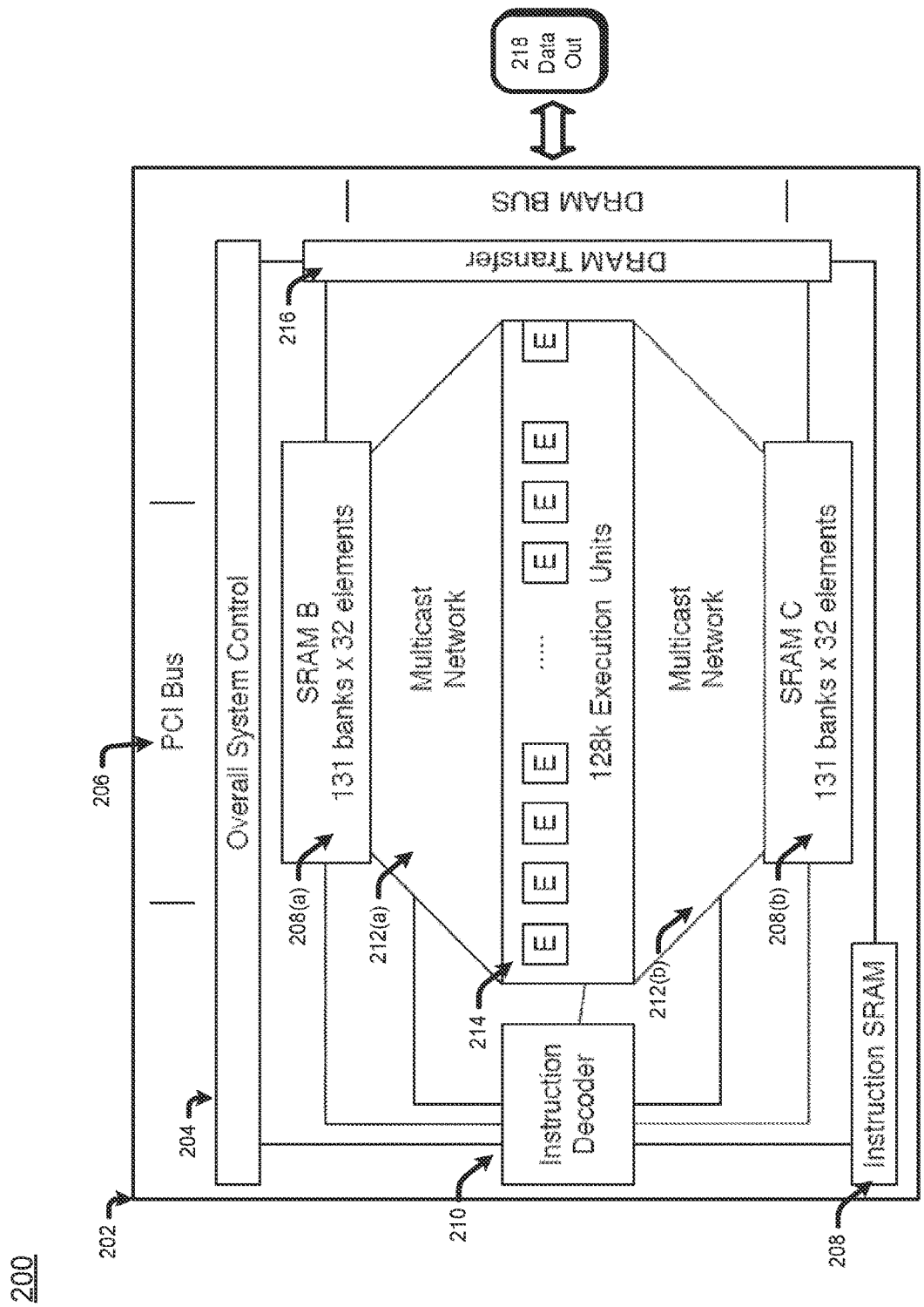
FIG. 2 is a block diagram for machine learning hardware acceleration.

The neural network hardware accelerator unit 116 is described in further detail with respect to FIG. 2 below. Note that the one or more multicast networks 130 and the data transfer units 134 have several optimizations. The multicast network optimizations are described in further detail with respect to FIGS. 3 and 4 below. The data transfer unit optimizations make use of features of group theory as described with respect to FIG. 5 below. The data transfer unit optimizations themselves are described with respect to FIGS. 6, 7 and 8 below.

Exemplary Architecture of a Neural Network Hardware Acceleration Unit

A closer examination of a neural network hardware acceleration unit 116 is merited. FIG. 2 provides a block diagram 200 of a neural network hardware acceleration unit expanding on the detail described with respect to FIG. 1.

The neural network hardware accelerator unit 202, it may interface with a server or with some other controlling CPU via a system control block 204 via a parallel bus or serial bus 206. In some implementations the interface is a PCI bus or PCI-E bus. However, any standardized bus is sufficient. A serial bus may be used, but at a performance cost of the overhead of serialization.

Computer instructions and/or operation codes may be stored in local memory 208 and interpreted by an instruction interpreter 210. The computer instructions may arrive via the system control block 204. Local memory 208 may be static random access memory (SRAM). The SRAM may be subdivided into a location for computer instructions to interpret and execute, and one or more areas of working memory 208(a), 208(b) each of which may be in at least some portion subdivided into multiple banks of memory.

At least some of the areas of working memory 208(a), 208(b) may be each associated with a multicast network 212(a), 212(b) comprised of switch nodes, which dispatch data stored in the working memory areas 208(a), 208(b) to one or more data receivers 214.

Figure 3:
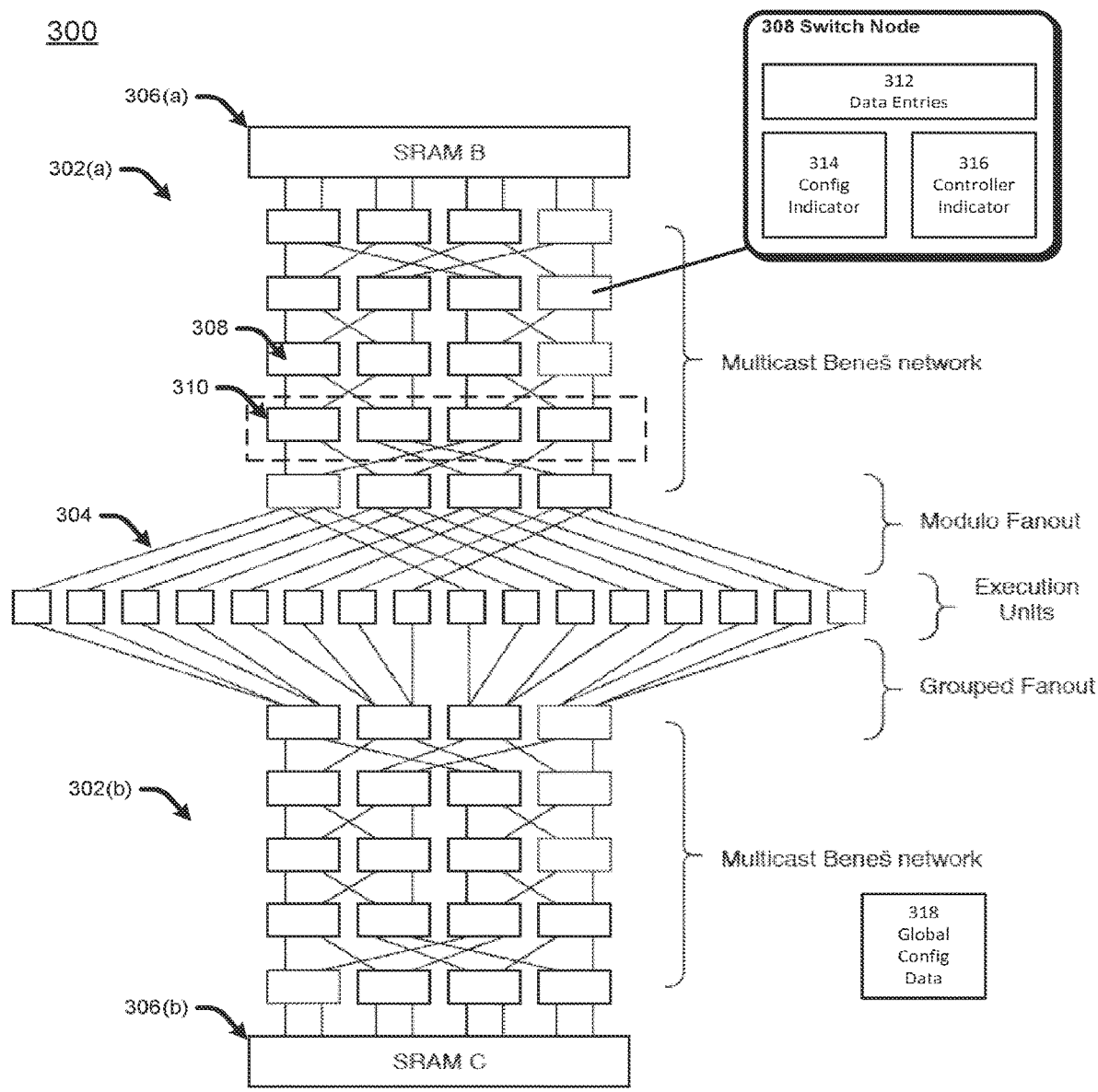
FIG. 3 is a block diagram for multicast network optimizations for machine learning hardware acceleration.
Figure 4:
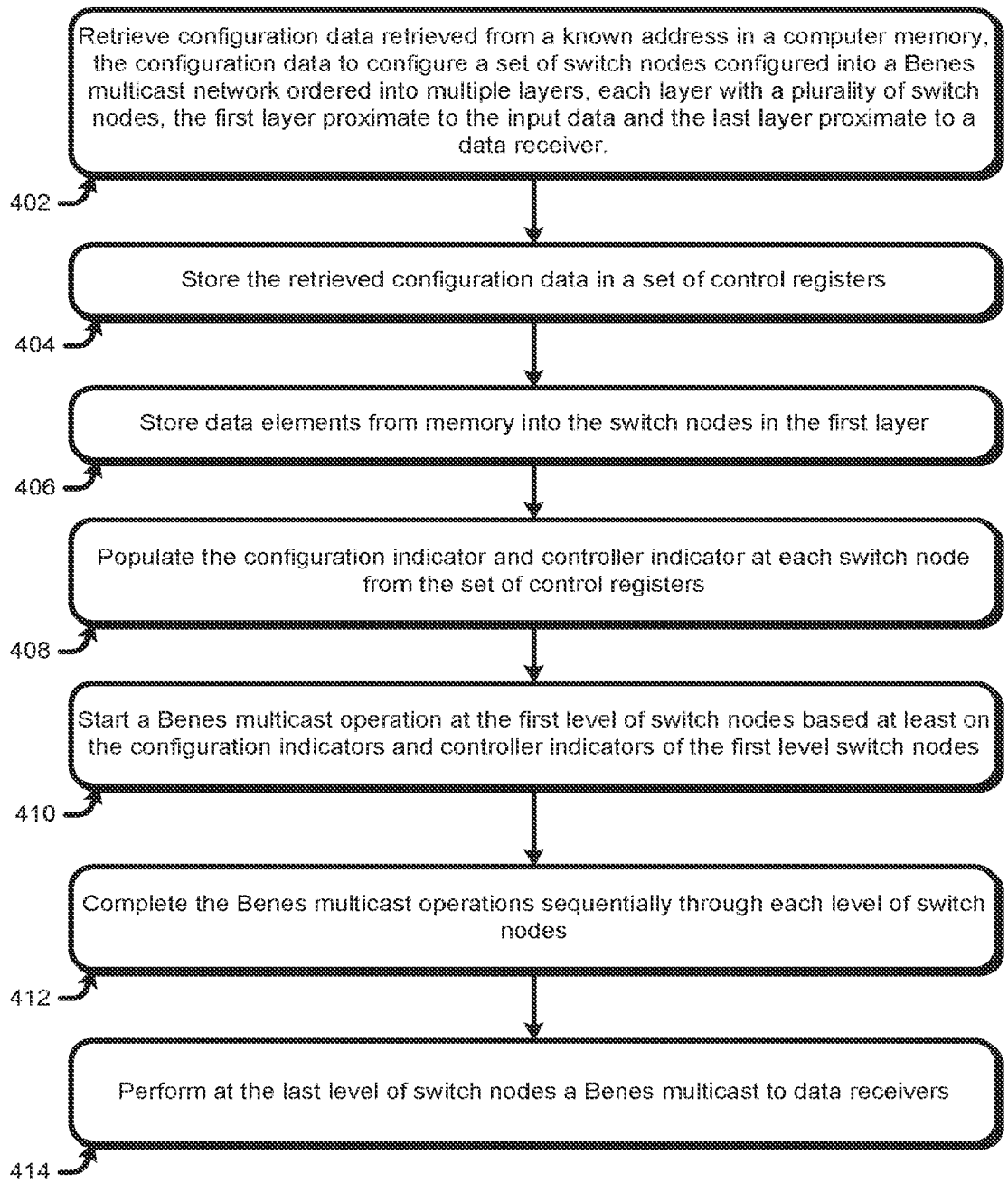
FIG. 4 is a flow chart for multicast network optimizations for machine learning hardware acceleration.

As described in further detail with respect to FIGS. 3 and 4, the switch nodes comprising a multicast network 212(a), 212(b) are organized into a plurality of layers, the first layer being proximate to the memory 208(a), 208(b) and the last layer being proximate to the data receivers 214. The switch nodes comprising the last layer access the data receivers 214 in some permutation of connections. Note that the connection permutations of the last layers of the different multicast networks 212(a), 212(b) respectively need not be the same.

Data receivers 214 may be one of several embodiments, depending on the application. For neural network applications 112, the data receivers 214 may be a plurality of execution units 214, each capable of executing computer executable instructions.

Data may be transferred from local memory 208 to off board memory, may be performed by a data transfer unit 216 over a data bus 218. In the case where off board memory is in the form of dynamic random access memory (DRAM), the data transfer unit 216 is a DRAM transfer unit and the data bus 218 is a DRAM bus.

Multicast Network Optimizations for Neural Network Hardware Acceleration

The multicast networks 212(a), 212(b) are designed to reorder and duplicate data from the memory 208(a), 208(b) in order to feed portions and permutation of the data in the memory 208(a), 208(b) deterministically. To achieve this, multicast networks 212(a), 212(b) are configured as Beneš networks, which are sets of switch nodes, organized into layers, where each switch node in a layer can duplicate and/or forward data to one or more switch nodes in subsequent layers. When input data have traversed all the layers, the data will have been rearranged into a desired permutation.

This feature of Beneš networks is desirable for neural network operations which make use of multidimensional matrices known as tensors. Tensors may be stored in contiguous memory, meaning that each of the data elements comprising a tensor resides in a memory block with sequential and uninterrupted memory addresses. By being able to select and permute arbitrary data elements, a Beneš network multicasting data elements to data receiver execution units 214 enable parallel operations on those multicast data elements.

For purposes of hardware acceleration, by making Beneš network configuration data globally accessible to all switch nodes in a multicast network, and by pipelining execution instructions, configuration and operation may be reduced to constant time (Big O(c)). FIG. 3 is a block diagram 300 of two multicast networks 302(a), 302(b), permuting input data into data receivers 304.

Each multicast network 302(a), 302(b), receives input data, usually in the form of data elements of a tensor, from areas of working memory 306(a), 306(b) organized into banks. As will be seen with respect to FIG. 5, organization of data elements of a tensor into banks lends itself to further optimization.

Each multicast network 302(a), 302(b) is comprised of switch nodes 308, organized into layers 310. The layers are ordered, where the first layer is proximate to the memory 306(a), 306(b) and the last layer is proximate to the data receivers 304.

One purpose for implementing two multicast networks 302(a), 302(b), is that in tensor operations, it may be desirable to access different partitions of the tensor. For example, in a two dimensional tensor, a matrix, the first multicast network 302(a) may perform operations on rows, and the other multicast network 302(b) may perform operations on columns. For this reason, the permutation of switch nodes 308 interfacing the data receivers 304 from the one multicast network 302(a) (i.e. the last layer of switch nodes of the first multicast network 302(a)) need not be the same permutation of switch nodes 308 interfacing the data receivers 304 from the other multicast network 302(b) (i.e. the last layer of switch nodes for the second multicast network 302(b)). In one embodiment, the first multicast network 302(a) permutation is modulo, and the second multicast 302(b) permutation is grouped fanout.

An individual switch node 308, may contain a one or more data entries, either received from memory 306(a), 306(b), or from a switch node 308 from a prior level 310. A switch node may contain a configuration indicator 314 and a controller indicator. The configuration indicator 314 specifies whether to perform a broadcast mode whether input data is to be forwarded according to the configuration data, or a passthru mode wherein input data is to be forwarded regardless of the configuration data. The controller indicator 316 specifies whether to update at least one switch node entry.

There may be a separate global configuration data store 318, either in the form of registers, or in the form of memory. The global configuration data is accessible by all switch nodes 308, and holds the value of the configuration indicators 314 and the controller indicators 316 of the switch nodes 308 respectively. Since the configuration data store 318 is globally accessible, in some embodiments, the switch nodes 308 may potentially not have locally stored values of the configuration indicator 314 and the controller indicator 316, and may instead just access the global configuration data store 318.

FIG. 4 is a flow chart 400 of a potential operation of the multicast networks 302(a), 302(b).

Block 402 starts configuration of a multicast network 302(a), 302(b) by retrieving configuration data retrieved from a known address from computer memory 306(a), 306(*b*). The retrieved configuration data is for configuring the switch nodes 308 comprising the multicast network 302(*a*), 302(*b*). In block 404, the retrieved configuration data is then stored in the global configuration data store 318.

In block 406, the data elements in computer memory 306(*a*), 306(*b*) to be operated on may be stored in the data entry storage 312 of the switch nodes.

Since all the switch nodes 308 have access to the global configuration data store 318, in block 408, at least the first layer 310 of switch nodes 308 in the multicast network 302(*a*), 302(*b*) may have their respective configuration indicators 314 and controller indicators 316 populated with the control data in the global configuration data store 318.

Note that at this point, the multicast network 302(*a*), 302(*b*) is configured. If blocks 102 and 404 are executed within one clock cycle, and block 408 is executed within one clock cycle, in effect (not counting insertion of no-operation instructions, also called no-ops), the multicast network 302(*a*), 302(*b*) is configured in two clock cycles, regardless of the amount of data. In effect the multicast network configuration is achieved in constant time (Big O(c)).

In block 408, a Beneš multicast operation at the first level of switch nodes commences the reordering and copying of the data elements stored in those switch node. A switch node 308 will determine whether to use configuration information, or to passthru data regardless of configuration based on the configuration indicator 314. The switch node 308 also considers the controller indicator 316 to determine which pattern to permute the data entries 312 to the next layer of switch nodes (or in the case of the last layer, to the data receivers 304).

The Beneš multicast operations are performed sequentially through each layer 310 of switch nodes 308, in block 410, until the last layer in block 412 performs the last Beneš multicast operation to permute the data elements into the data receivers 304.

Note that in the case of passthru, because operation proceeds regardless of the value of the configuration indicators 314 and controller indicators 316, operation may proceed within one clock cycle, skipping the operations to load and propagate control information.

Group Theory Backgrounder for Memory Transfer Optimizations

Before discussing memory transfer optimizations, a background in the group theory underpinnings of the disclosures herein is in order. Common operations in neural networks include tensor operations involve one partition of a tensor, is operated on another partition of that tensor or a different tensor. The partitions are comprised of data elements that are regularly spaced within their tensor. The data elements comprising the partitions may be called tiles.

Since the tiles comprising a partition may operate on their operands independently, this gives rise to an opportunity to perform the operation in parallel, thereby greatly saving processing time. Accordingly, it is useful to have the ability to retrieve and move tiles of a partition of a tensor in as small a number of operations as possible.

Group theory is the branch of mathematics that describes sets and their respective behavior over an operator. For example, the set of integers is a group with respect to the addition operation, since the addition of any two integers yields an integer. There are other aspects of a set that give rise to a group.

Figure 5:
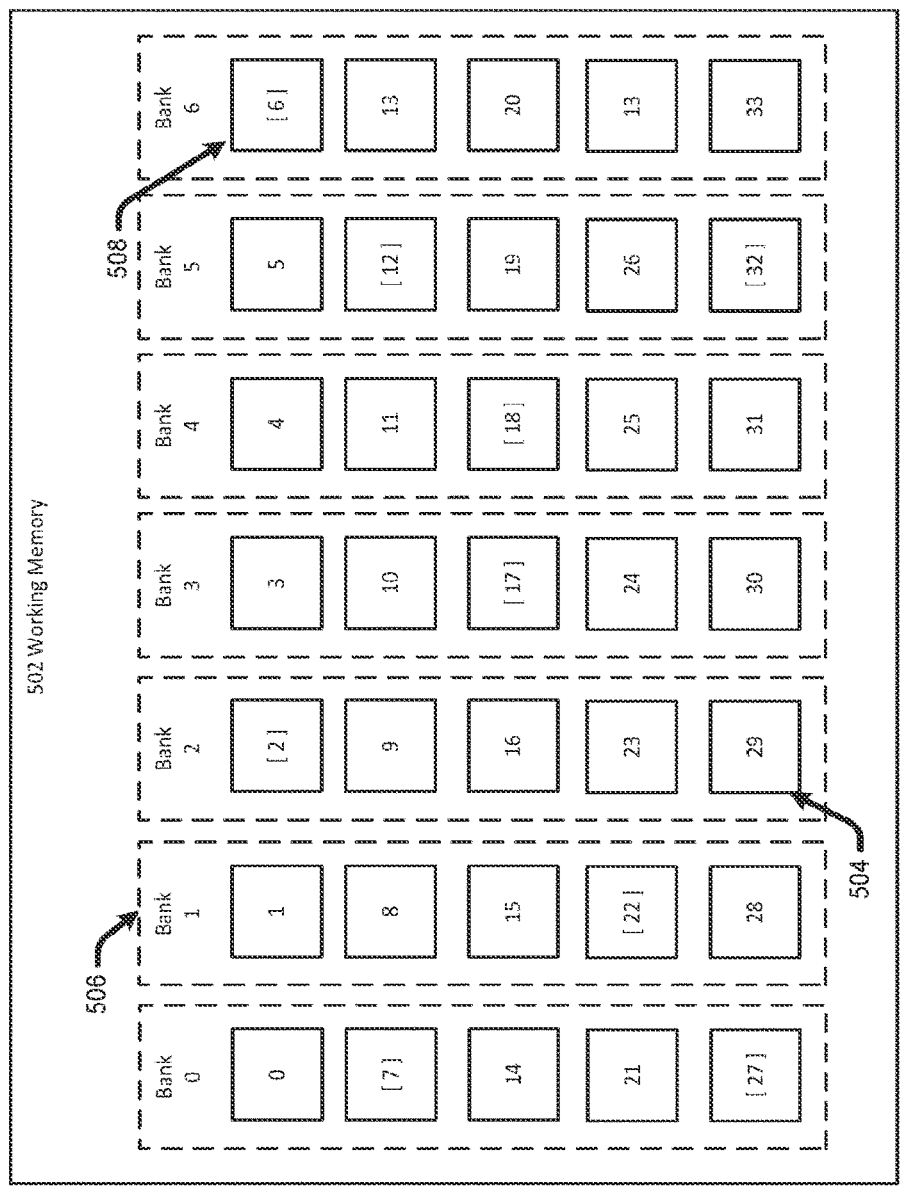
FIG. 5 is a context diagram for accessing strides of contiguous banked computer memory.

One group is a finite group of integers modulo D, where D is some positive integer. Such a group is also called a cyclic group D, denoted herein $C_D$. The memory techniques herein make use of a cyclic group $C_D$ where D is the number of banks in a working group of memory. FIG. 5 is a diagram 500 of such a working area 502. The banks 504 are indexed from 0 to D-1, and store a plurality of data elements 506. The data elements comprising a partition 508 are indicated in brackets.

The data elements are stored in contiguous memory. Note that contiguous means that the data elements are stored in consecutive, uninterrupted, memory addresses. The memory addresses need not be physical address, but can also relate to a virtual memory space. Since the partitions are spaced in regular intervals, and because we access data, elements across the distance of those regular intervals, called "strides" (i.e. that is every Dth element plus some offset O), we can identify the bank that stores the desired data element according to the formula O+(M*i) % D, where O is the starting offset of a memory storing a tensor, D is the number of banks, and M is the stride of the tensor in memory. This ability lets us access tiles from a tensor in a constant number of operations, potentially within in a single processor instruction.

To avoid collisions, the number of banks D should be prime and the stride of the data elements M is not a strict multiple of D. Alternatively the number of banks D should be relatively prime to the stride of the data elements M, and the partition to be retrieved should be a vector with less than D data elements.

For example, say we want to access every fifth element. This would be to say that M=5. Let us also presume that the starting offset address 0 is 2 and that the number of banks D is 7. Consequently we may read up to 7 elements, each of which will be read from a distinct bank of memory since 5 is relatively prime to 7. (Most certainly both 5 and 7 are prime numbers in their own right.) Accordingly:

(2+5*0)% 7=2% 7=2
(2+5*1)% 7=7% 7=0
(2+5*2)% 7=12% 7=5
(2+5*3)% 7=17% 7=3
(2+5*4)% 7=22% 7=1
(2+5*5)% 7=27% 7=1
(2+5*6)% 7=32% 7=4

For a given value of O and M, as long as M is relatively prime to D, we can always permute the logically ordered data elements, so that each access i goes to a unique bank. However, in a hardware implementation we must physically perform this permutation for arbitrary O and M. To remove the effect of O, it suffices to perform a rotation. Fast hardware implementation of rotation is an understood problem. To handle the effect of the stride, M, we rely on another property of prime fields. Specifically, multiplication modulo D, for a prime D, of the elements 1 to D-1 form a group as well. This group is in fact isomorphic to the cyclic group D-1. If M is not a strict multiple of D, this means that we can implement the effect of the multiplication by M by first applying a fixed permutation to map from the multiplication group of D to the cyclic group D-1, followed by a rotation in the group D-1, followed by another fixed permutation to back to the multiplication group of D. Hardware to implement fixed permutations can be done by wiring in metal layers, and the rotation as mentioned earlier is well understood.

Now we need to determine the fixed permutation use, as well as to compute the amount of rotation within the cyclic group D-1, which we shall call 'r'.

To define these permutations, we must choose a generator over the multiplication prime field in question. A generator for a group is an element that, by repeated applications, produces all the elements of the group. For example, for the prime field over D=7, 3 is a multiplicative generator:

$3^1$ (mod 7)=3
$3^2$ (mod 7)=2
$3^3$ (mod 7)=6
$3^4$ (mod 7)=4
$3^5$ (mod 7)=5
$3^6$ (mod 7)=1

The chosen generator is denoted as g. Note that D and g are fixed at the time of design. A discrete log with respect to g, $\log_g(x)$, can be defined as the value y such that $g^y$ (mod D)=x. For example, for g=3, D=7, we compute $\log_g(6)=3$.

Since the rotation to handle the multiplicative part of the permutation happens in the cyclic space, it is required to compute the discrete log to determine the amount to rotate, which is complex to perform in hardware. In practical implementations, one may presume that M, and thus m, and $\log_g$ (m) are known in advance. This allows a compiler to perform the appropriate computations and provide a fixed constant for the rotation. Specifically, to determine the necessary rotation, we compute:

$$n=(\log_g(m)+1)\%(D-1)$$

Namely, to specify a transform, o and r are provided at the time of permutation. It is to be noted that the permutation network may be configured to one of two different variants. The first variant is called a forward modulo permutation network, which maps each i<D to a correspondingly appropriate bank position b=(O+M*i) % D given the correct o and n. This permutation is used to send address and data to the memory banks (i.e., for memory write operations). The second variant is called the reverse modulo permutation network, which simply performs the inverse mapping of the forward modulo permutation network, and is used to appropriately reorder the read data elements due to memory read operations.

Before forward and reverse modulo permutation networks can be described in greater detail, two simple wiring patterns are to be defined. The two wiring patterns are used to perform the mapping a logical group and a cyclic group. Specifically, a first wiring pattern, map_to_cylic is defined to take D-1 elements and map each entry i of the D-1 elements to entry $\log_g(i)$, for 1<=i<D. A second wiring pattern, map_from_cylic is defined to do the opposite and map entry i to entry $g^i$ (mod D). Since 0 is not a member of the multiplicative group, entry 0 of the elements left unaltered by both the mapping and the rotations. This structure is described in greater detail with respect to FIG. 6 below.

Permutatons

Figure 6:
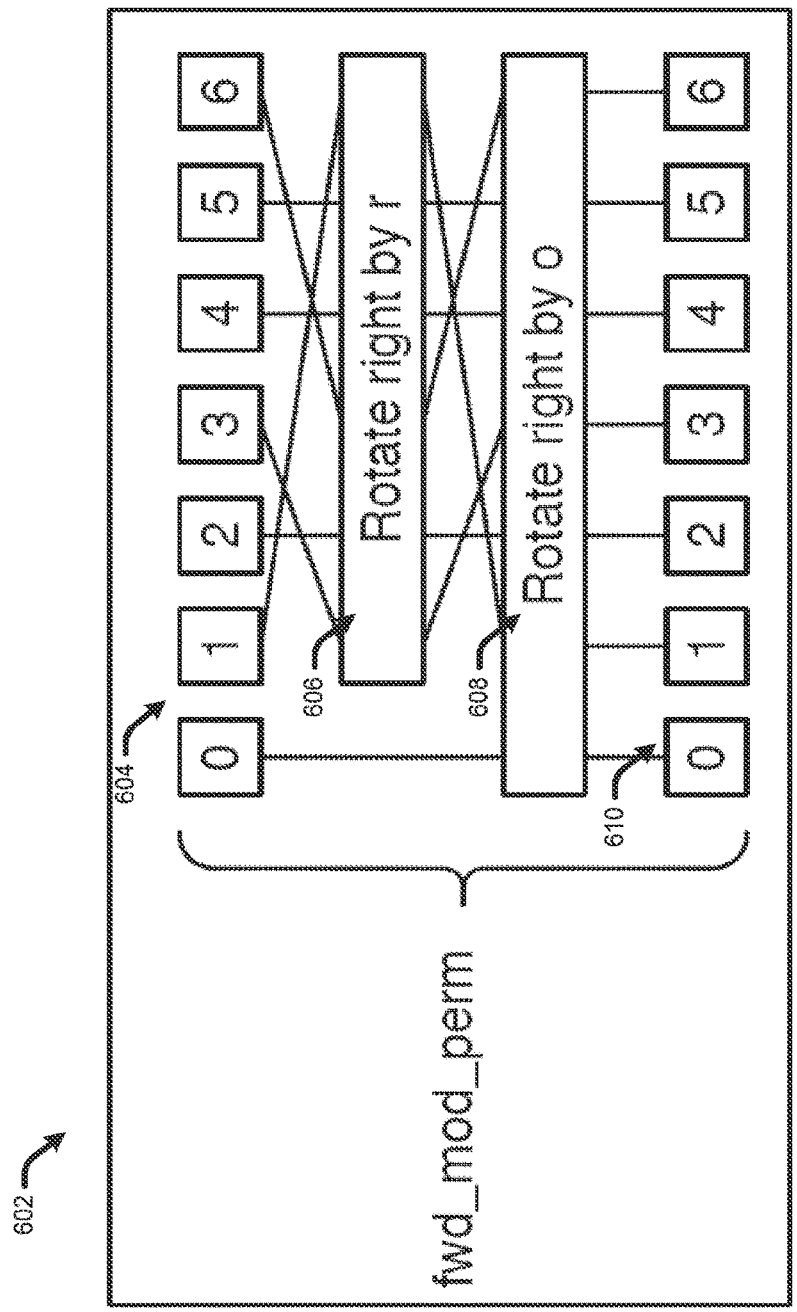
FIG. 6 is a block diagram for a permutaton used in DRAM transfer optimizations for machine learning hardware acceleration.

The hardware implementation of the memory transfer operations described above include the ability to permute data elements. A hardware deice to do so is termed a permutaton. FIG. 6 is a block diagram 600 of a permutaton 602.

Consider receiving a parameter where o=O % D, where O is the offset start in memory, the memory storing data elements in contiguous memory and the memory organized into D banks in the memory. Further consider receiving a parameter r which represents the number of rotations to perform for a cyclic group less than D, wherein r is based at least on the discrete log of a generator g, $\log_g$.

A permutaton comprises a number of inputs to permute 604. The inputs will generally correspond to D inputs, usually banks. Those inputs 604, are then mapped to a permutation via a first cyclic map 606 from inputs indexed 1 through D. In hardware this operation may be implemented via a right barrel shifter, which performs a right rotation of the data elements from 1 through D.

The permutaton then permutes the data elements via a second cyclic map 608 that rotates of all the data elements from 0 through D-1 to the right. This may be performed via a right barrel shifter, which performs a right rotation of the data elements from 0 through D-1 and thereto forward the permuted data elements to outputs 610.

Note that a reverse permutaton, which restores the data elements to their original positions, may be implemented via a left barrel shifter which performs a left rotation of the data elements 0 through D-1 followed by a left barrel shifter which performs a left rotation of the data elements 1 through D. In this way, a reverse permutaton is the hardware inverse of a permutaton.

Between the permutaton and the reverse permutaton, hardware support for permutation operations for the memory transfer techniques disclosed herein are supported.

Memory Transfer Optimizations for Neural Network Hardware Acceleration

Figure 7:
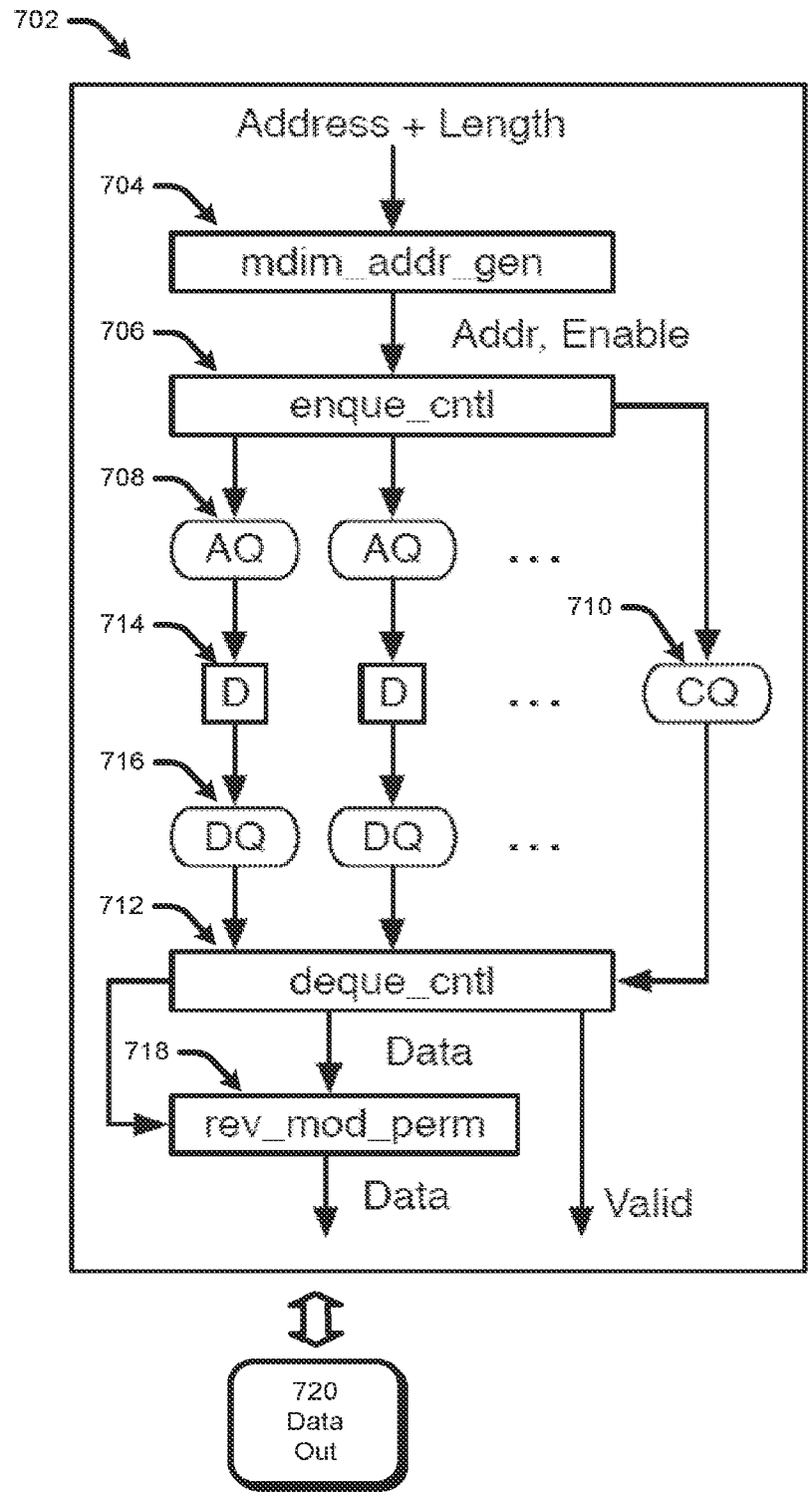
FIG. 7 is a block diagram for DRAM transfer optimizations for machine learning hardware acceleration.
Figure 8:
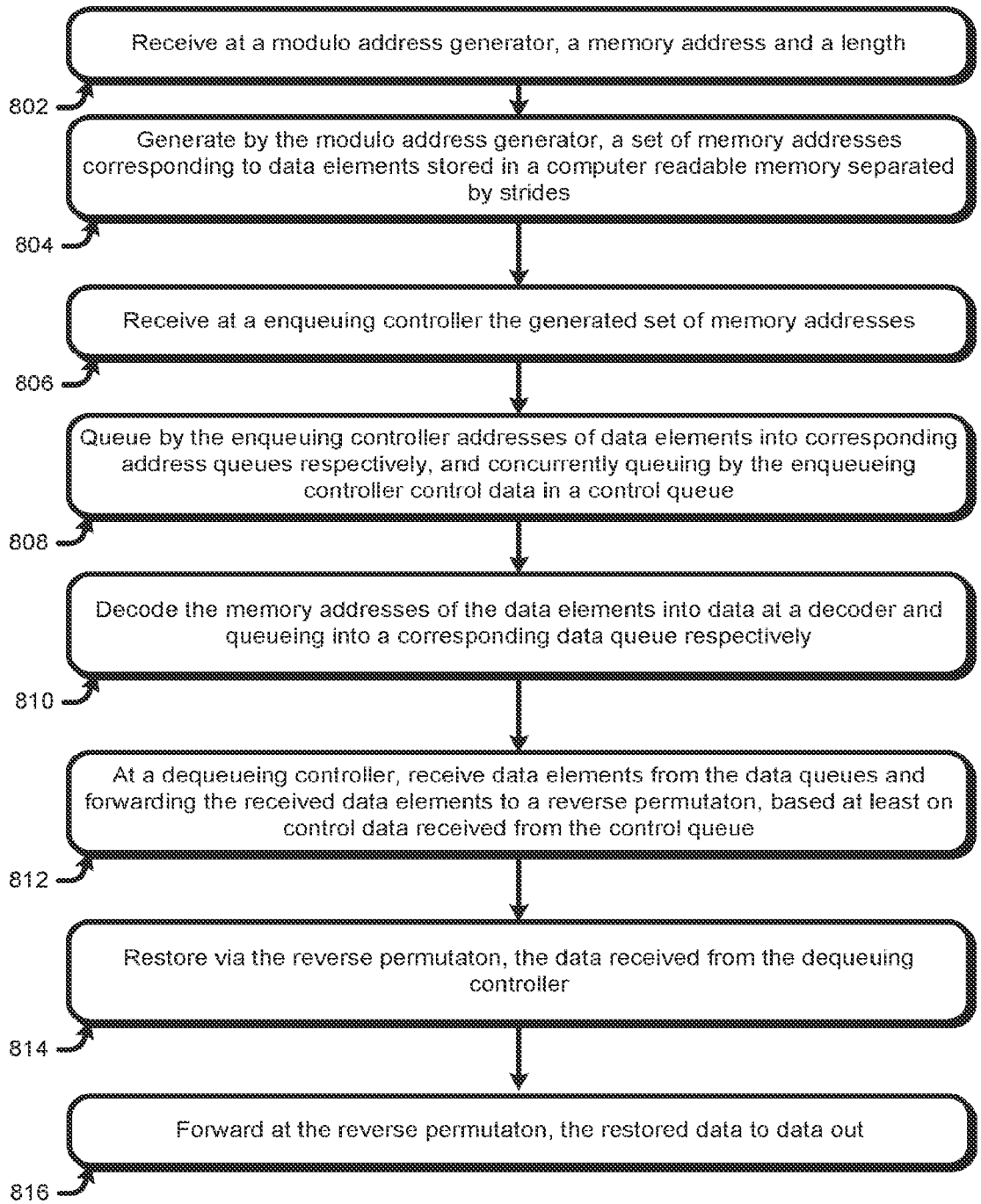
FIG. 8 is a flow chart for DRAM transfer optimizations for machine learning hardware acceleration.

Permutatons may be applied to create a memory transfer unit optimized for neural network hardware acceleration. FIG. 7 is a block diagram 700 of an exemplary memory transfer unit 702. FIG. 8 is a flow chart 800 of an exemplary operation of the memory transfer unit 700.

A modulo address generator 704 is a forward or standard permutaton. It receives inputs from data banks, permutes the data elements per input parameters o and r as described with respect to FIGS. 5 and 6 above. Specifically, per block 802 in the flow chart 800, the modulo address generator receives a memory address and a length, and in block 804 of the flow chart 800, the modulo address generator 704 generates a set of memory addresses corresponding to data elements stored in a computer readable memory separated by strides.

The enqueuing controller 706, is responsible for controlling the forwarding of the received data elements into D address queries 708. Specifically, the address queues 708 store memory addresses of the data elements in hardware rather than the values of the data elements themselves. In block 806 of the how chart 800, the enqueuing controller 706 receives the set of memory addresses generated by the modulo address generator 704, and in block 808 of the flow chart 800, forwards the memory addresses into the corresponding address queues 708, while concurrently adding control information into a control queue 710. The control information is used to synchronize reception on a receiving dequeuing controller 712.

The address queues 708 feed into a plurality of address decoders 714 respectively which in turn feed into a plurality of data queues 716 respectively. Specifically, in block 810 of flow chart 800, the address decoders 714 decode the memory addresses of the data elements in the address queues 708, into their respective data elements, and queue the decoded data elements into the data queues 716 respectively.

In block 812 of the flow chart 800 the dequeuing controller 710 receives the queued data elements from the data queues 714, and receives the control information from the control queue 708, and forwards to a reverse permutaton 716, based at least on the received control information.

In block 814 of the flow chart 800, the reverse permutaton 718 performs the inverse operation of the modulo address generator's 704 forward permutaton, for restore the data received from the dequeuing controller 712. Upon doing so, in block 816 of the flowchart 800, the restored data is forwarded to data out 720.

Exemplary Use Cases

As described with respect to FIG. 1, the multicast network and memory transfer optimizations disclosed herein may be applied to neural network operations. One or more multicast networks may be used to forward permutations of data elements stored in memory banks to a plurality of execution units. If multiple multicast units are used, then those units may use different permutations to feed into execution units. In one embodiment, different multicast units may relate to different partitions of a tensor.

In this way, the multicast network and the memory transfer units may be thought of discretely and separately from the context of a neural network hardware accelerator, each with applications potentially unrelated to neural network hardware acceleration.

By way of example, the multicast network and memory transfer optimizations may be used in other hardware acceleration contexts, such as graphical processing including the calculation of linear algebra operations, tensor operations specific to graphics and quaternion operations.

In the case of memory transfer optimizations, the application need not be specific to particular operations, but may be used simply in a memory controller. For example, where partitions and/or vectors of a data elements stored in contiguous memory are to be transferred, the memory transfer optimizations may be applied. Furthermore, because the multicast network optimizations may copy and permute data elements arbitrarily, used in conjunction with the memory transfer operations may provide the basis for a full memory controller.

CONCLUSION

Although subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a computer readable memory organized into D banks, to store contiguous data including a plurality of data elements of size M which are constituent data elements of a vector with N data elements, the data elements of size M to start at an offset address O; and
   a modulo address generator to generate addresses of data elements of a vector with i data elements stored in the computer readable memory, the modulo address generator comprising at least one forward permutation to permute data elements with addresses of the form O+M*i where 0<=i<N.

2. The system of claim 1, further comprising:
   an enqueuing controller, to be communicatively coupled to the modulo address generator;
   a plurality of address queues, each to store a plurality of memory addresses respectively, the address queues to be coupled to the enqueuing controller;
   a plurality of data decoders, a data decoder to be coupled to and corresponding to each address queue respectively, the plurality of data decoders to decode a memory address to retrieve the data stored at the memory address;
   a plurality of data queues, each to store a plurality of data elements respectively, the data queues to be coupled and corresponding to each data decoder respectively; and
   a dequeuing controller to be communicatively coupled to the plurality of data queues and to the enqueuing controller via a control queue to store control data to ensure synchronization.

3. The system of claim 2, further comprising a reverse permutation to be communicatively coupled to the dequeuing controller and restore any rotations performed.

4. The system of claim 2, wherein the number of banks D is relatively prime to a stride of the data elements of size M, and the number of data elements N in a vector is less than D.

5. The system of claim 2, wherein the number of banks D is prime and a stride of the data elements of size M is not a strict multiple of D.

6. The system of claim 2, wherein the control data is to include information as to a number of rotations a permutation is to perform based at least on a generator integer g, the control data to be provided at compile time.

7. The system of claim 2, further comprising a hardware indicator to perform at least one of track which element in a bank to access and track if there are to be multiple accesses of the bank.

8. A method comprising:
   receiving a parameter o where o=O% D where O is an initial offset address for a computer readable memory storing a number of data elements in contiguous memory and organized into D banks;
   receiving a parameter r which specifies a number of rotations to perform for a cyclic group less than D, wherein r is based at least on a discrete log of generator g;
   performing a rotation of data in banks D-1 through D of the D banks; and
   performing a rotation of data in banks O through D of the D banks.

9. The method of claim 8, wherein performing the rotation of the data in the banks D-1 through D is to be implemented via a right barrel shifter.

10. The method of claim 8, wherein performing the rotation of the data in the banks O through D is to be implemented via a right barrel shifter.

11. The method of claim 8, further comprising performing a reverse rotation of the data in the banks O through D-1.

12. The method of claim 11, wherein performing the reverse rotation of the data in the banks in O through D-1 is to be implemented via a left barrel shifter.

13. The method of claim 11, further comprising performing a reverse rotation of the data in the banks 1 through D.

14. The method of claim 13, wherein performing the reverse rotation of the data in the banks 1 through D is to be implemented via a left barrel shifter.

15. A method comprising:
   receiving at a modulo address generator, a memory address and a length;
   generating by the modulo address generator, a set of memory addresses corresponding to data elements stored in a computer readable memory separated by strides;
   receiving at an enqueuing controller, the generated set of memory addresses;
   queuing by the enqueuing controller addresses of data elements into corresponding address queues respectively, and concurrently queuing by the enqueuing controller control data in a control queue;

decoding the memory addresses of the data elements into data at a decoder and queuing into a corresponding data queue respectively;

at a dequeuing controller, receiving data elements from the data queues and forwarding the received data elements to a reverse permutation, based at least on the control data received from the control queue;

restoring via the reverse permutation, the data elements received from the dequeuing controller; and forwarding at the reverse permutation, the restored data elements to an output.

16. The method of claim 15, wherein receiving at the modulo address generator, the memory address and the length comprises receiving at one of a forward permutation and a standard permutation, the memory address and the length.

17. The method of claim 15, wherein at the dequeuing controller, receiving the data elements from the data queues to be synchronized based in part on the control data received from the control queue.

\* \* \* \* \*